(12) United States Patent
Sankar et al.

(10) Patent No.: US 7,873,229 B2
(45) Date of Patent: Jan. 18, 2011

(54) DISTRIBUTED PROCESSING FOR VIDEO ENHANCEMENT AND DISPLAY POWER MANAGEMENT

(75) Inventors: Ananth Sankar, Palo Alto, CA (US); David Romacho Rosell, Barcelona (ES); Anurag Bist, Newport Beach, CA (US)

(73) Assignee: Moxair, Inc., Newport Beach, CA (US)

( * ) Notice: Subject to any disclaimer, the term of this patent is extended or adjusted under 35 U.S.C. 154(b) by 667 days.

(21) Appl. No.: 11/496,191

(22) Filed: Jul. 31, 2006

(65) Prior Publication Data
US 2007/0183678 A1    Aug. 9, 2007

Related U.S. Application Data

(63) Continuation-in-part of application No. 11/471,356, filed on Jun. 20, 2006, now Pat. No. 7,692,612.

(51) Int. Cl.
*G06K 9/40* (2006.01)
(52) U.S. Cl. ............... 382/254; 348/606; 358/3.26; 345/87
(58) Field of Classification Search ............... 382/100, 382/168, 169, 172, 254, 255, 274, 275; 348/606–624; 358/1.9–3.31, 447, 461, 463; 345/418, 581, 345/87, 55, 619, 617
See application file for complete search history.

(56) References Cited

U.S. PATENT DOCUMENTS

| | | | | |
|---|---|---|---|---|
| 5,150,421 A | * | 9/1992 | Morishita et al. | 382/169 |
| 5,410,617 A | * | 4/1995 | Kidd et al. | 382/169 |
| 5,524,070 A | * | 6/1996 | Shin et al. | 382/274 |
| 6,801,210 B2 | * | 10/2004 | Yomdin et al. | 345/581 |
| 2002/0114530 A1 | * | 8/2002 | Duarte | 382/254 |

* cited by examiner

*Primary Examiner*—Anand Bhatnagar
(74) *Attorney, Agent, or Firm*—Peter A. Businger

(57) ABSTRACT

In visual display devices such as LCD devices with backlight illumination, the backlight typically consumes most of device battery power. In the interest of displaying a given pixel pattern at a minimized backlight level, the pattern can be transformed while maintaining image quality, with a transform determined from pixel luminance statistics. Aside from, or in addition to being used for such minimizing, a transform also can be used for image enhancement, for a displayed image better to meet a visual perception quality. In either case, the transform preferably is constrained for enforcing one or several display attributes. In a network setting, the technique can be implemented in distributed fashion, so that subtasks of the technique are performed by different, interconnected processors such as server, client and proxy processors.

56 Claims, 8 Drawing Sheets

Transform computation using piecewise slope computation

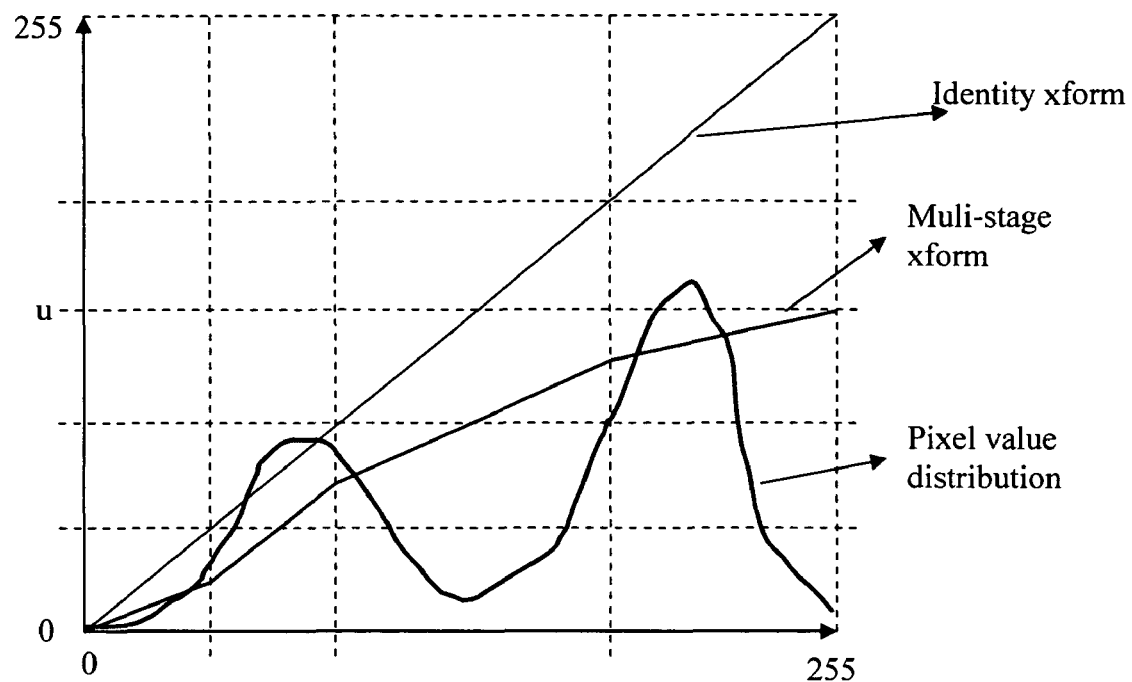
Figure 1: Multi-stage transform

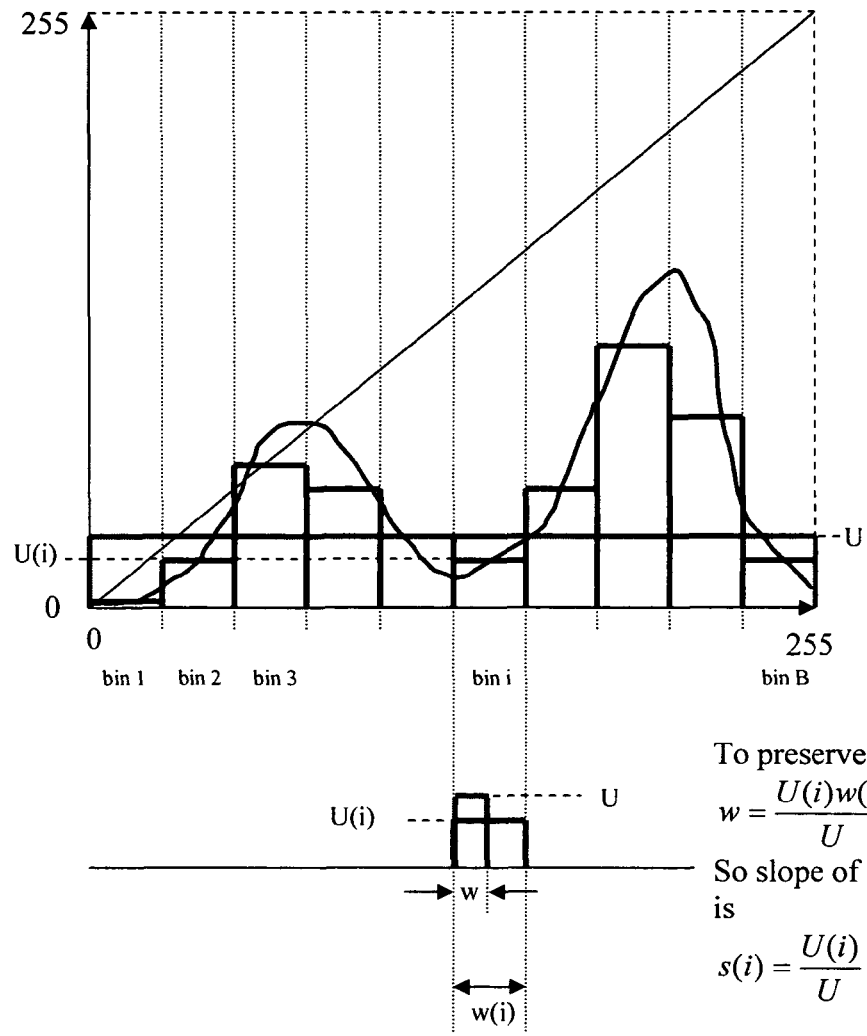
Figure 2: Slope computation

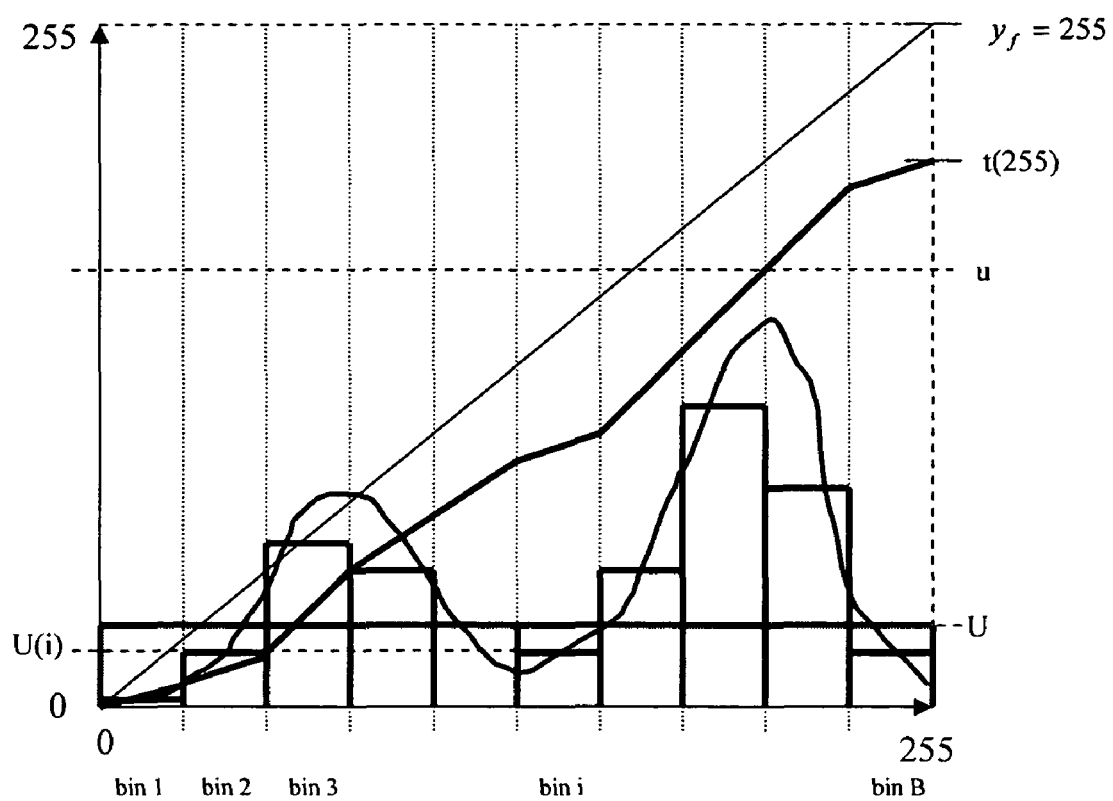
Figure 3: Transform computation using piecewise slope computation

1. Divide pixel value range into $B$ uniform bins. The set $P_i$ of pixel values in bin $b_i$ is defined as:
$$P_i = \{p : (i-1)*w(i) \le p < i*w(i) - 1\}, \text{ and } w(i) = w = 256/B$$

2. For each bin $b_i$, compute
$$U(i) = \frac{\sum_{p \in P_i} h(p)}{w(i)}, \text{ where } h(p) \text{ is the number of pixels with luminance} = p$$

3. For each bin $b_i$, compute slope as
$$s(i) = \frac{U(i)}{U}, \text{ where } U = \frac{\sum_{i=1}^{B} U(i)w(i)}{256}$$
If $s(i) > s_{max}$ then $s(i) = s_{max}$
If $s(i) < s_{min}$ then $s(i) = s_{min}$ 4. Starting at $(0,0)$, use the slopes $s(i)$ to create the piecewise linear transform, $t(p)$ Figure 4: Algorithm MULTISTAGE

Scaling: Let the required final value of the transform be $y_f$

1. If $y_f > t(255)$, then
   a. $h = y_f - t(255)$
   b. $scale = \dfrac{h + \sum_{i \in X} s(i)w(i)}{\sum_{i \in X} s(i)w(i)}$, where X is the set of bins whose slopes are less than $s_{max}$ c. for $i \in X$
   $$s(i) = scale * s(i)$$
   if $s(i) > s_{max}$ then $s(i) = s_{max}$
   end d. if any $s(i) > s_{max}$ in *step c*, go to *step b*

2. If $y_f < t(255)$, then
   a. $h = t(255) - y_f$
   b. $scale = \dfrac{\sum_{i \in Y} s(i)w(i) - h}{\sum_{i \in Y} s(i)w(i)}$, where Y is the set of bins whose slopes are greater than $s_{min}$ c. for $i \in Y$
   $$s(i) = scale * s(i)$$
   if $s(i) < s_{min}$ then $s(i) = s_{min}$
   end d. if any $s(i) < s$ in *step c*, go to *step b*

Figure 5: Algorithm SCALING

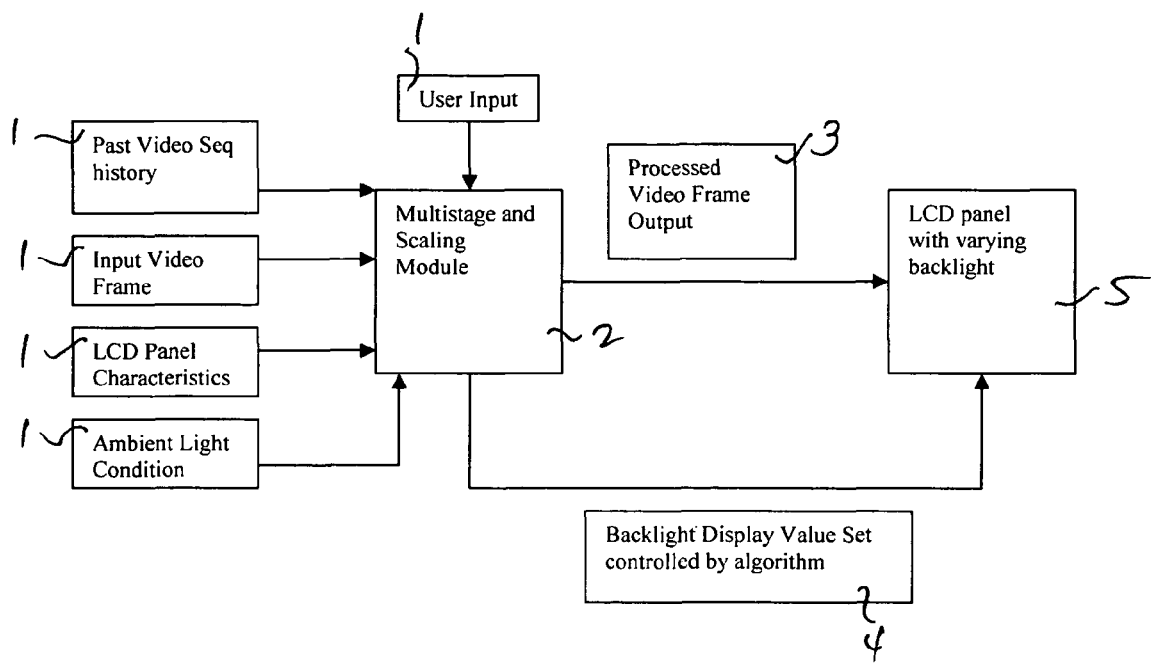
Figure 6: Inputs and Outputs for Display Power Management and Video Quality Enhancement

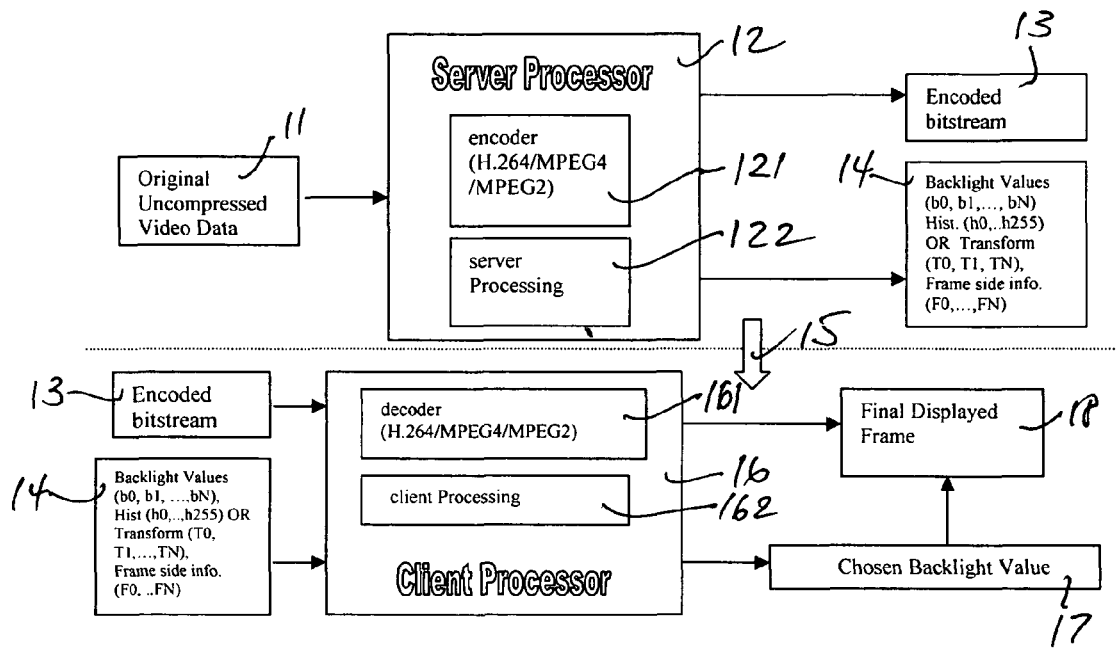

|  | SERVER SIDE | | | | | CLIENT SIDE | | | | |
|---|---|---|---|---|---|---|---|---|---|---|
| CASES | 1 | 2 | 3 | 4 | 5 | 1 | 2 | 3 | 4 | 5 |
|  |  |  |  |  |  |  |  |  |  |  |
|  |  |  |  |  |  |  |  |  |  |  |
| Compute histogram | X | X | X | X |  |  |  |  |  | X |
| Determine backlight | X | X | X |  |  |  |  |  | X | X |
| Compute transform | X | X |  |  |  |  |  | X | X | X |
| Apply transform | X |  |  |  |  |  | X | X | X | X |
| Set backlight on display |  |  |  |  |  | X | X | X | X | X |

Fig. 8

DISTRIBUTED PROCESSING FOR VIDEO ENHANCEMENT AND DISPLAY POWER MANAGEMENT

This is a continuation-in-part application of patent application Ser. No. 11/471,356 of Jun. 20, 2006 now U.S. Pat. No. 7,692,612.

TECHNICAL FIELD

The invention concerns power management and image enhancement in visual display devices and, more particularly, in liquid crystal display devices.

BACKGROUND OF THE INVENTION

Visual display devices are ubiquitous in battery-powered portable electronic devices such as notebook computers and mobile, hand-held telephones where, typically, they are the largest consumers of battery power. For example, in mobile devices equipped with thin-film transistor (TFT) liquid-crystal displays (LCD) utilizing backlight illumination, the LCD panel consumes more than 30% of the device power and the backlight typically consumes 75% of the LCD power. Thus, for conserving battery power, there is primary interest in minimizing the power consumption of the display device.

An LCD screen typically includes an array of liquid-crystal pixels arranged as a plurality of rows each having a plurality of pixels, arranged in columns, with each pixel capable of displaying any one of 256 luminance values of a gray scale and the corresponding chrominance values. Each pixel has its own liquid crystal cell, a dedicated thin-film transistor, and a dedicated capacitor. The electrical field of the capacitor controls the orientation of the liquid crystals within the cell, determining the optical transmissivity of the cell and thus its luminance when lit by a backlight. The capacitor is charged and discharged via its transistor. Device activation typically is row-by-row, so that, at any one time, all column lines are connected to a single row.

For saving power in an LCD device, dynamic backlight control can be used, involving dynamic scaling down and up of the backlight brightness while the device is being used, e.g. in playing back a movie. Moreover, it is beneficial to correspondingly transform an image/pattern to be displayed by transforming the pixel luminance values.

For determining a transform and applying the transform to pixel luminance values, it is convenient to employ a processor made or instructed for performing arithmetic and logical operations. Such a processor may be in communication with one or more other processors, as in a communications network, for example.

SUMMARY OF THE INVENTION

When the display backlight is set at a specific brightness value, a preferred transformation, (1), of the pixel values can be determined for minimizing perceived image distortion between the original untransformed image at maximum backlight and the transformed image under the specific backlight condition. Furthermore, a preferred transformation, (2), of the pixel values can be determined for minimizing power consumption while meeting an image-quality requirement. A preferred transformation can maximize the luminance of a given pattern and provide optimal contrast by assigning each pixel a value from a given dynamic range of pixel values based on the value of the probability density of the pixel luminance values for the given pattern. Preferably, in effecting a transformation, certain display attributes are taken into account for imposing constraints on transform parameters. In a network setting, the technique can be implemented in distributed fashion, so that subtasks of the technique are performed by different, interconnected processors such as server, client and proxy processors.

BRIEF DESCRIPTION OF THE DRAWING

FIG. 1 is a graph showing an exemplary pixel value distribution along a line of 256 pixel values as may arise for a particular given pattern, and further showing the graphs of the identity transform and of an illustrative multi-stage transform.

FIG. 2 is a graph showing the pixel value distribution of FIG. 1 approximated by a step function, and further showing how the transform slopes are computed.

FIG. 3 is a graph showing a multi-stage transform obtained for the step function of FIG. 2.

FIG. 4 is a representation of an exemplary procedure for transforming the given pixel values using the pixel value distribution of the given pattern in accordance with a preferred embodiment of the invention.

FIG. 5 is a representation of a further exemplary procedure for transforming the given pixel values using the pixel value distribution of the given pattern, representing a further preferred embodiment of the invention.

FIG. 6 is a block schematic of an exemplary embodiment of the technique.

FIG. 7 is a block schematic of an exemplary distributed-processing embodiment of the technique.

FIG. 8 is a table of exemplary feasible allocations of processing tasks in distributed processing.

DETAILED DESCRIPTION

Transform Shape

For a transformation technique, FIG. 1 shows given or input pixel luminance values on the x-axis, output pixel values on the y-axis, and a pictorial representation of a distribution of the pixel values. The straight line from (0, 0) to (255, 255) represents the identity transform which saves no power and causes no distortion. For backlight control, a transform is desired so that, after scaling the backlight, the maximum perceived luminance value is u<255 at x=255. Then, assuming that the perceived luminance of the pixel is the product of the backlight value and the transformed pixel value, we can scale the backlight by a factor of u/255, saving power.

FIG. 1 also shows a generic multi-stage transform with 4 stages as an example. More generally, on judicious choice of the number of stages/segments and their slope, any desired transformation can be effected. The invention includes techniques for advantageously determining the number of stages and their slopes.

Constraints on Transform Shape

A preferred transform will meet certain constraints for preventing undesirable effects. For example, if at any stage the slope of the transform were 0, then all the pixel values in that range would get compressed to a single value, resulting in total loss of contrast there. This is the case for certain transforms previously known in the art which clip the high pixel values to a threshold value, resulting in washout of bright pixels in the image. For example, washout will impair images of bulbs and lights due to loss of contrast in the region of the light. Conversely, if a slope is too large, pixel values that are close to each other are dramatically separated in the pixel-value space, causing a distorted rendition as compared with the original image. For example, where a given pixel value distribution has a peak, a swath of pixels have very similar luminance, e.g. in the court of a basketball scene. If the transform then has a high slope for these pixel values, the transformed court will have dramatically varying luminance, and the image will appear distorted.

In addressing such concerns, a preferred technique imposes two constraints on the slope, m, of the transform in any stage:

$$m \leq s_{max},$$

$$m \geq s_{min}, \quad (1)$$

where $s_{max}$ and $s_{min}$ are determined from a target backlight scaling factor, u/255. Then $$s_{max} = 255/u$$

$$S_{min} = s \times 255/u$$

where s is a suitably chosen parameter.

With these constraints, a preferred multistage transform can give good power savings through dynamic backlight control, maintaining brightness, maintaining contrast where necessary, avoiding contrast distortion in important regions, and minimizing washout effect as compared with known transforms.

Estimation of Multistage Transform

For the present description of a preferred technique for estimating a desired multi-stage transform it will be assumed that u is given, i.e. that we know the required backlight scaling factor, and hence the power savings. The technique aims at finding a transform that minimizes distortion while achieving power savings determined by u. A basic exemplary procedure can be described as follows:

(a) In regions where the histogram value is high, i.e., where there are several pixels with that range of values, we maintain the original contrast by using as large a slope value as possible.

(b) In regions where the histogram value is low, i.e., where there are few pixels with values in that range, we use a lesser slope. Contrast is reduced in these regions, but because it affects only a few pixels the reduction is not perceived as much.

We start by dividing the x-axis into B bins, where B can be between 0 and 255. A typical value of B may be between 5 and 30. Then we integrate the original histogram within these bins to get a piecewise uniform density function as shown in FIG. 2. U(i) denotes the value of the uniform density in bin i.

FIG. 2 also shows the uniform density over the entire dynamic range for comparison. The value of this density is denoted as U. If U(i)>U, then the number of pixels in bin i is greater than average, suggesting that we should maintain the original contrast by using an appropriate slope. If U(i)<U, then a less-than-average number of pixels is indicated in bin i, and so we can afford to lose some contrast by using a lesser slope. For example, as shown in FIG. 2, a practicable slope can be chosen as the one that transforms the uniform density with the value U(i) in bin i to another uniform density with the value U. This slope is given by $$s(i) = \frac{U(i)}{U} \quad (2)$$

On taking account of the constraints given by Equation 1, we obtain the following for determining the slope for bin i:

If $s(i) > s_{max}$, then $s(i) = s_{max}$

If $s(i) < s_{min}$, then $s(i) = s_{min}$

FIG. 3 shows what the transform can look like after this step. At this point, the transform does not necessarily meet the desired maximum perceived luminance value, u. Using the target backlight scaling factor, u/255, the maximum desired transformed luminance can be computed as $$y_f = \min(255, x_f \times 255/u)$$

where $x_f$ is the maximum input luminance for the frame.

Typically, $x_f > u$, thus typically $y_f = 255$. FIG. 3 shows this case; $y_f = 255$ is the maximum transformed luminance, allowing a scaling of the backlight by a factor of u/255 to result in a maximum displayed brightness of u. FIG. 3 also shows u, the value the maximum perceived luminance. We are now interested in modifying the computed transform so that it has a maximum value=$y_f$. In FIG. 3, $y_f$ is more than the maximum value given by the current transform, t(255), so that we can scale up the transform by an appropriate factor. If $y_f$ were less than t(255), then we would scale down the transform. In either case we honor the constraints given by Equation 1.

FIG. 4 shows an exemplary algorithm, designated as MULTISTAGE, for determining the transform t(p), $0 \leq p \leq 256$. It can be used for task (1) as described in the Summary above.

For task (2) we further seek to meet a prescribed maximum perceived brightness after backlight scaling. FIG. 5 shows an exemplary algorithm, there designated as SCALING, which can be used for task (2). On combining procedures MULTISTAGE and SCALING, both tasks can be performed simultaneously. We note a number of typical applications of the two algorithms individually and in combination as follows:

1. Apply MULTISTAGE alone. Use the maximum value, t(255), to determine the backlight scaling factor, t(255)/255. This seeks to give the best possible image without trying to meet any particular power saving goal.

2. Apply MULTISTAGE. Determine the backlight scale factor based on the desired backlight setting, u. The scale factor is given by u/255. Then apply SCALING. This yields an optimal video or image and also meets the desired power saving goal.

3. Apply a transform with a fixed slope from 0 up to a certain threshold pixel value. Use MULTISTAGE after this threshold value. This seeks to maintain maximum brightness, while still achieving contrast at the high pixel values.

4. Proceed per Application 3 above, and then apply SCALING as in Application 2.

5. Proceed per Application 4 above, but, when applying SCALING, scale the fixed-slope transform only if the minimum slope constraints cannot be met.

6. When used for video, apply a low-pass filter in time to smooth the transform determined for each frame of a scene by any of Applications 1-5 above. This minimizes flicker as may result from very fast transform changes frame to frame.

7. Apply a high-pass filter to sharpen the edges of the video processed by any of applications 1 to 6 described above.

8. By scaling of chrominance pixels, apply a color boost to the chrominance values for improving the color combination of the processed image. For example, in a preferred embodiment in the YUV space, the U and V components each are scaled up by a respective fixed factor. Alternatively, chrominance scaling can involve a generic functional transform of the luminance component.

Interaction with Environment

For an over-all view of a typical implementation of the technique, FIG. 6 shows different types of input 1 to a processor 2 for generating processed video frame output 3 as well as a backlight value 4 for display of video frame output 3 on an end-client-display device 5. As illustrated, for example, input 1 can include any/all of: values and statistics of pixels of an input video frame, values and statistics of a past video frame in a sequence of video frames, LCD panel characteristics of the display device 5, ambient light conditions of the environment in which the input video frame was generated, and user input. Input data are used by processor 2 in determining transform parameters, determining a backlight value, and transforming pixel values. At the display device 5, the transformed pixel values can be displayed against a backlight as determined by processor 2, or against some other supplied background. For display, a video/image may be targeted for either or a combination of (i) least power consumption on the display device 5 and (ii) best possible enhancement as compared with the input.

Techniques of the invention can be applied for static backlight setting of an individual display, or dynamically in a scenario where the backlight can be changed from frame to frame of a video sequence. In either case, in processing a frame, the processor 2 can make reference to at least one previously processed frame. A previous frame can also be used for smoothing, e.g. with a suitable small portion a of the pixel values of a previous frame added to a portion $(1-\alpha)$ of the current frame of a scene.

Technological Benefits and Uses

Techniques of the invention can generate high-quality video, still images, graphics, and screen shots of other multimedia applications such as Microsoft Power Point and Word applications, all at minimized display backlight power or at any specific display backlight power. Furthermore, the techniques can be useful for enhancing a display even where there may be little or no concern with backlight power. Techniques can be implemented for power management and/or image enhancement in notebook-PC's, media players such as DVD playback devices, handheld consumer electronic devices, portable media players, personal digital assistant (PDA) devices, LCD TV's and mobile phones, for example.

Distributed Processing

The technique, as described above, can be implemented in various ways of performing processing tasks. For example, processing can be allocated in its entirety to a server/encoder, or to a client/decoder. Furthermore, for use with functionally interconnected computers, e.g. in a network, processing can be distributed between server and client processors having respective capabilities for encoding bitstream and transmitting side information, and decoding bitstream and deciphering side information for video on a per-frame basis. Further in a network, certain processing tasks can be carried out by proxies in communication with a client, direct or indirect. Side information can include executable code for tasks yet to be carried out.

For distributed processing, FIG. 7 illustrates an exemplary server-client arrangement. From source 11, uncompressed original video data is supplied to server 12 for encoding and partial processing by respective modules 121 and 122 which may or may not interact with each other in generating the encoded video bitstream 13 and side information 14 including a set of backlight values B=(b0, b1, . . . , bN), a set of histogram values H=(h0, h1, . . . , h255), and a further set of frame-dependent information F=(F0, F1, . . . , FN). In an exemplary alternative embodiment, instead of the histogram values a set of transformations T=(T0, T1, . . . , TN) is generated.

The encoded bitstream 13 and side information/transformations 14 are transmitted via a communications channel 15 to a client 16 including a decoder 161 and a module 162 for complementing the processing of module 122. On selecting a backlight value 17, a final display frame 18 is obtained. The frame 18 can be displayed on the client LCD panel, with benefit of enhanced video quality at lowest power, for example.

As a benefit of such distributed processing, client work load can be lightened especially when histogram information or a desired transform is generated at the server and transmitted as side information. Furthermore, by including side information with the bitstream on a per-frame basis, the client can be given a choice in modifying the decoded frame for a specific environment's needs. Thus, one and the same bitstream can be viewed differently by each of different clients, on using the transmitted side information in combination with user parameters. For example, a client can use the received side information including histogram or the transform, backlight values, and other frame-dependent parameters to generate different final frames from one and the same bitstream. This may involve use of different parts of the side information, and/or of the same parts in different ways in determining a transformation. Such choices can be made by a client to suit its environment and preferences, allowing different clients to use the same received data in different ways.

In one embodiment of the invention, all processing can be done in the server where the individual frames can be transformed for a given backlight value. The encoder then can generate the appropriate bitstream for each transformed frame. The server can transmit the encoded bitstream, along with side information including the preferred backlight to be used in the client. The client processor can decode the received bitstream for displaying the corresponding image on the client LCD panel at the preferred backlight value that has been deciphered from the side information. In another embodiment, when the client processor already knows a preferred backlight value, no side information need be transmitted, and no additional processing is required by the client processor.

With reference to the table of FIG. 8, to illustrate allocation of processing tasks to server and client processors, a set of five exemplary tasks of the technique may be identified, including (1) computing a histogram of luminance values, (2) determining a backlight value, (3) determining a transform, (4) applying the transform, and (5) setting a backlight value on display. For five exemplary implementations, numbered 1 to 5 in the table of FIG. 8, in corresponding server and client columns each "X" indicates allocation of a task to server or to client. Further feasible allocations between server and client are not precluded, and tasks may be distributed further to proxy intermediaries between server and client.

Application of the technique can be combined with decoding, on providing a decoder with suitable side information along with a bitstream to be decoded. Histogram information, or a preferred transform, as well as additional side information can be obtained from a current frame, as illustrated in FIG. 7, for example. Or also, in case of a continuing video scene, information from a previous frame may be adequate for transforming the current frame. A scene change can be detected by the client or can be signaled by means of side information, for example.

When suitable information is available at the decoder, a transform can be established prior to decoding, so that, on decoding a bitstream, each block can be transformed in-line. This approach reduces memory access bandwidth and enhances overall efficiency of the technique.

Further to enhance efficiency, whether at a server or a client, establishing a histogram can be facilitated by sub-sampling an input frame, e.g. 2×2, 4×4 or 8×8, thereby reducing computational work by a factor if 4, 16 or 64, respectively. Such savings are at a certain expense of histogram resolution or accuracy. An exemplary embodiment uses a 2×2 sub-sampling for a standard QVGA resolution image of 320×240 pixels.

Yet further enhancement of efficiency can be obtained on implementing the technique so as to access multiple sets of image/video data, for processing concurrent with reading and writing. A processor capable of reading and writing simultaneously can enable vectorization in transforming and color compensation. Advantageously, a processor may have special capabilities for establishing vital statistics, e.g. of histograms. And, entirely within a suitable video decoding module, a transformation can be effected in transform domain involving only the DC component.

The invention claimed is:

1. A computer method in determining a pixel display pattern from a pixel given pattern using a transform, comprising the steps of:
   (A) enhancing obtained input information into output information, thereby furthering progress towards:
     (a) for at least one display attribute, the transform meeting at least one constraint, and
     (b) for at least one substantially uniform background luminance value and subject to the at least one constraint, the transform being such that, if the pixel display pattern is displayed against the substantially uniform background, visual distortion as compared with the pixel given pattern is minimized; and
   (B) forwarding the output information for one of (i) further enhancement and (ii) display of the pixel display pattern.

2. The method of claim 1, wherein the pixel given pattern is one of a video sequence.

3. The method of claim 2, comprising utilizing the side information for processing a current video frame of a sequence of video frames.

4. The method of claim 3, wherein the side information is from the current video frame.

5. The method of claim 3, wherein the side information is from a preceding video frame.

6. The method of claim 5, wherein the preceding video frame is immediate predecessor to the current video frame.

7. The method of claim 2, further comprising temporal low-pass filtering of sequential transformed display patterns.

8. The method of claim 1, wherein the input information comprises luminance values of at least a portion of the pixels of the pixel given pattern.

9. The method of claim 1, wherein the input information comprises side information for furthering the progress.

10. The method of claim 9, wherein the side information comprises executable code.

11. The method of claim 9, wherein the side information comprises at least one backlight value which is suited for utilization for a substantially uniform background for the pixel display pattern.

12. The method of claim 11, wherein the side information comprises at least one parameter value functionally dependent on the at least one backlight value.

13. The method of claim 9, wherein the side information comprises at least a portion of histogram information of pixel-given-pattern luminance values.

14. The method of claim 13, wherein the histogram information comprises subsampled histogram information.

15. The method of claim 9, wherein the side information comprises at least a portion of the transform.

16. The method of claim 1, wherein further enhancement in step (B) (i) comprises applying the transform to the pixel given pattern.

17. The display of the pixel display pattern of step (B) (ii) of claim 1.

18. The method of claim 1, effected by a server in a communications network functionally connecting the server with a client.

19. The method of claim 18, comprising at least one of: determining histogram information, determining backlight value information, determining transform information, and applying the transform.

20. The method of claim 1, effected by a client in a communications network functionally connecting the client with a server.

21. The method of claim 20, comprising setting the backlight value.

22. The method of claim 21, further comprising at least one of: determining histogram information, determining backlight value information, determining transform information, and applying the transform.

23. The method of claim 1, effected by a proxy in a communications network functionally connecting a server with a client.

24. The method of claim 23, comprising at least one of: determining histogram information, determining backlight value information, determining transform information, and applying the transform.

25. The method of claim 1, comprising embedded decoding of the pixel given pattern.

26. The method of claim 1, effected at least in part using vectorized processing.

27. The method of claim 1, wherein the transform comprises a DC-component transform.

28. The method of claim 1, wherein the pixel given pattern has chrominance, and the method comprises determining a factor for scaling the chrominance.

29. The method of claim 1, wherein the at least one constraint is for minimizing washout in a generated pixel-display-pattern image.

30. The method of claim 1, wherein the at least one constraint is for maintaining contrast in a generated pixel-display-pattern image.

31. The method of claim 1, comprising determining the transform from statistics of pixel-luminance-given values of the pixel given pattern.

32. The method of claim 31, wherein the statistics comprises histogram information.

33. The method of claim 1, wherein the substantially uniform background luminance value is prescribed.

34. The method of claim 1, comprising determining the substantially uniform background luminance value from information obtained from pixel-luminance-given values of the pixel given pattern.

35. The method of claim 34, wherein the information is obtained from a histogram of the pixel-luminance-given values.

36. The method of claim 34, comprising effecting step (A) (b) for a plurality of different background luminance values.

37. The method of claim 1, comprising determining a minimized background luminance value.

38. The method of claim 37, comprising determining the minimized background luminance value using statistics of pixel-given-luminance values of the pixel given pattern.

39. The method of claim 1, comprising determining the transform as a piecewise linear function.

40. The method of claim 39, wherein each of the linear pieces of the piecewise linear function spans at least one bin of a histogram of pixel-luminance-given values of the pixel given pattern.

41. The method of claim 39, wherein at least one of the linear pieces of the piecewise linear function has a slope which is determined from:

local statistics of the pixel-luminance-given values in a histogram bin spanned by the at least one of the linear pieces, and global statistics over all histogram bins.

42. The method of claim 39, wherein the at least one constraint comprises a constraint on a slope of a linear piece of the piecewise linear function.

43. The method of claim 42, wherein the constraint is such that, at contiguous low pixel luminance values of the pixel given pattern, the slope is fixed.

44. The method of claim 42, wherein the constraint is such that, at contiguous high pixel luminance values of the pixel given pattern, the slope is fixed.

45. The method of claim 1, further comprising high-pass filtering of the pixel display pattern.

46. The method of claim 1, comprising generating different uniform background luminance values for different pixel display patterns of a plurality of pixel given patterns of a video sequence.

47. The method of claim 1, wherein the input information comprises pixel-luminance-given values of the pixel given pattern, and at least one of: (i) video sequence history, (ii) LCD panel characteristics, and (iii) ambient light condition.

48. The method of claim 1, wherein the output information comprises the substantially uniform background luminance value.

49. The method of claim 1, further comprising displaying the pixel display pattern on a display device.

50. The method of claim 49, wherein displaying is against a background having the substantially uniform background luminance.

51. The method of claim 49, wherein displaying is against a background other than the background having the substantially uniform background luminance.

52. The method of claim 49, wherein displaying is against a background having a luminance which is chosen at a client processor.

53. The method of claim 49, wherein the display device is included in one of: a notebook-PC, a DVD playback device, a handheld consumer electronic device, a portable media player, a PDA device, an LCD TV and a mobile phone.

54. A processor instructed for collaborating for display of a pixel display pattern generated from a pixel given pattern using a transform, wherein instruction is for at least a portion of:

(a) for at least one display attribute, determining at least one constraint on the transform;

(b) for at least one substantially uniform background luminance value and subject to the at least one constraint, determining the transform such that, if the pixel display pattern is displayed against the substantially uniform background, visual distortion as compared with the pixel given pattern is minimized; and (c) applying the transform to the pixel given pattern.

55. A device for collaborating for display of a pixel display pattern generated from a pixel given pattern using a transform, made for at least a portion of effecting:

(a) for at least one display attribute, determining at least one constraint on the transform;

(b) for at least one substantially uniform background luminance value and subject to the at least one constraint, determining the transform such that, if the pixel display pattern is displayed against the substantially uniform background, visual distortion as compared with the pixel given pattern is minimized; and (c) applying the transform to the pixel given pattern.

56. A service for generating a pixel display pattern from a pixel given pattern using a transform, wherein (a) the transform is subject to at least one constraint for satisfying at least one display attribute;

(b) for at least one substantially uniform background luminance value and subject to the at least one constraint, the transformation is determined such that, if the pixel display pattern is displayed against the substantially uniform background, visual distortion as compared with the pixel given pattern is minimized.

* * * * *